UNITED STATES PATENT OFFICE.

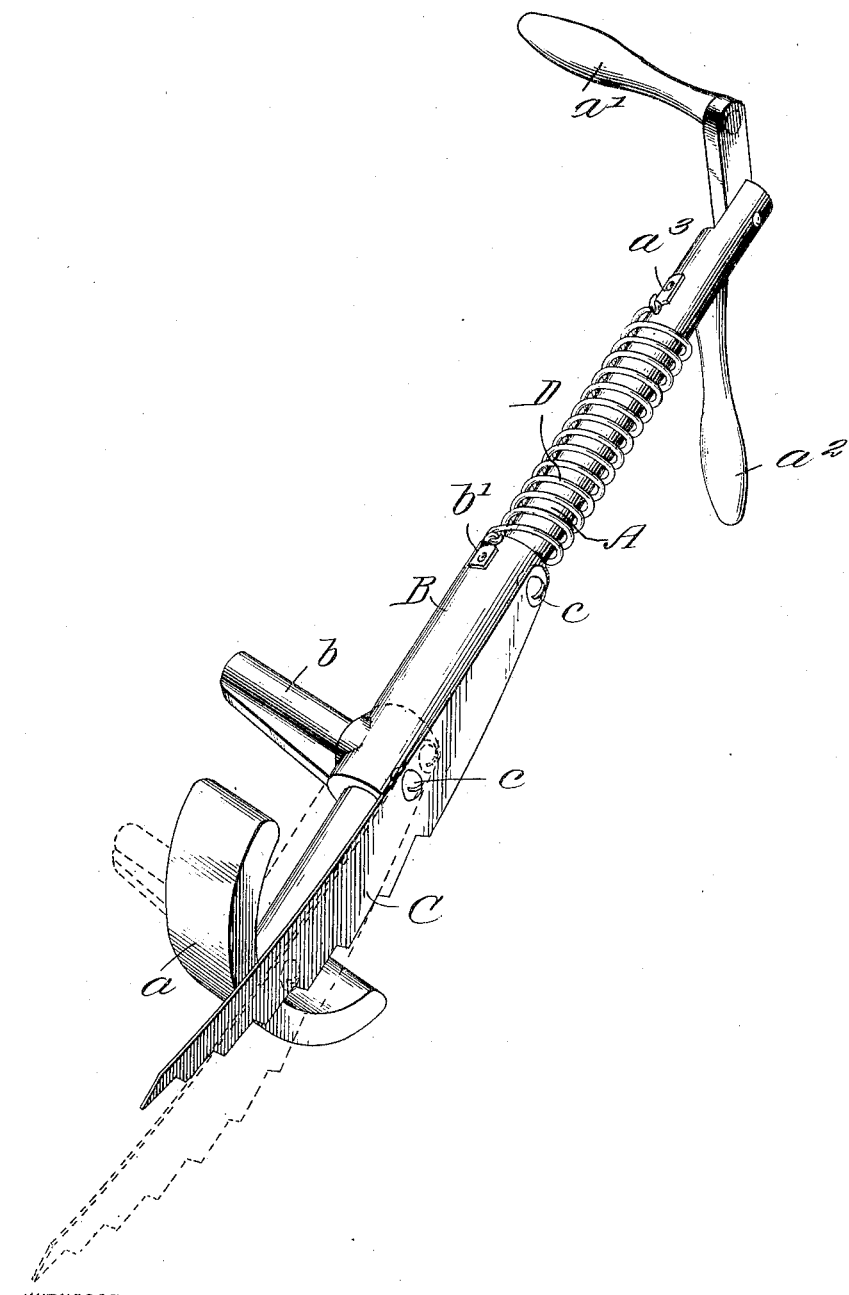

JAMES F. SLUSSER, OF JACKSON, IDAHO.

HAY-KNIFE.

1,082,363.

Specification of Letters Patent.

Patented Dec. 23, 1913.

Application filed May 3, 1913. Serial No. 765,264.

*To all whom it may concern:*

Be it known that I, JAMES F. SLUSSER, a citizen of the United States, and a resident of Jackson, in the county of Cassia and State of Idaho, have invented certain new and useful Improvements in Hay-Knives, of which the following is a specification.

My present invention relates to hay knives, and more particularly to a hay knife embodying a cutter which is movable with respect to the handle thereof, my object being to do away with the body strain incident to the usual form of hay cutting knife in cutting hay in the stack.

With the above object in mind, my invention resides in the particular features of construction and arrangement to be now described with respect to the accompanying drawing forming part of this specification and in which the figure is a perspective view of my improved hay knife.

Referring now to this figure, the handle bar A is provided with a guard $a$ at one end and with angularly extending handle grips $a'$ and $a^2$ at its opposite end. Upon the bar A is slidably disposed a tubular carriage B, to one side of which is secured by set-screws $c$ the cutting blade C and from the opposite side of which a laterally extending foot piece $b$ projects.

In the movement of the carriage B, the cutting blade C moves along one side of the guard $a$ as may be clearly seen by a comparison of the full and dotted lines in the figure. In order that the knife carriage may be conveniently operated by one foot while the handle is grasped and held in the operator's hands, I provide the carriage with one or more lugs $b'$ having hooks with which one end of retractile spring D is engaged, the opposite ends of this spring being similarly connected to the hook of lug $a^3$ connected to the handle bar A adjacent its end from which the angular grips $a'$ and $a^2$ project, this spring D serving to retract the carriage B after its movement against the guard $a$ as shown in dotted lines.

Thus from the foregoing, it may be readily seen that in its operation, the hay knife which I have shown and particularly described may be conveniently and easily operated without necessitating the operator assuming cramped positions or working upon his knees and with which the hay may be cut in a stack just as effectively and with much less work as compared to the various forms of hay knives now in use.

I claim:

1. A hay knife comprising a handle bar having a guard at one end and provided with angular handle grips at its opposite end, a lug secured to the handle bar adjacent its last mentioned end and provided with a hook, a knife carriage slidable on the handle bar toward and away from the said guard, a cutting blade secured to one side of the carriage and movable along one side of the said guard, a laterally extending foot piece secured to and projecting from the opposite side of the knife carriage, a lug carried by the carriage and provided with a hook, and a retractile spring engaged with the lug of the knife carriage and the lug of the handle bar whereby to move the carriage in one direction.

2. A hay knife comprising a handle bar provided with a guard at one end and handle grips at its opposite end, a knife carriage slidably disposed upon the handle bar and having a laterally projecting foot piece, a spring connected to the carriage and to the handle bar and tending to cause movement of the carriage toward the handle grips, and a cutting blade secured to one side of the carriage, said cutting blade being movable along one side of the guard and provided with a longitudinally extending cutting edge, all for the purpose described.

3. A hay knife comprising a handle bar provided at one end with a laterally curved guard and having handle grips at its opposite end, a knife carriage consisting of a sleeve slidably disposed on the handle bar and provided with a laterally projecting foot piece extending from one side thereof, a flat blade secured to opposite side of the sleeve and projecting along one side of the guard, said blade having a toothed longitudinal cutting edge, and a spring connected to the sleeve and to the handle bar and tending to move the sleeve toward the handle grips, all for the purpose described.

JAMES F. SLUSSER.

Witnesses:
JAMES D. CONNERVEY,
W. J. SMITH.